T. E. DANIELS & A. REED.
Coffins.
No. 201,872.          Patented April 2, 1878.
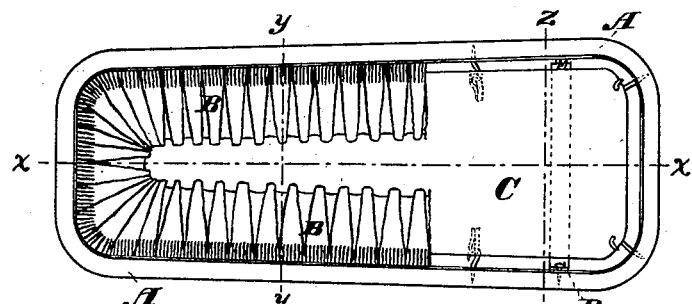
Fig.1
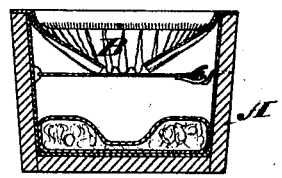
Fig.3
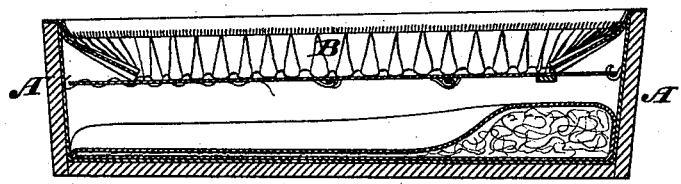
Fig.2
Fig.4
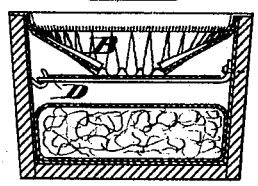
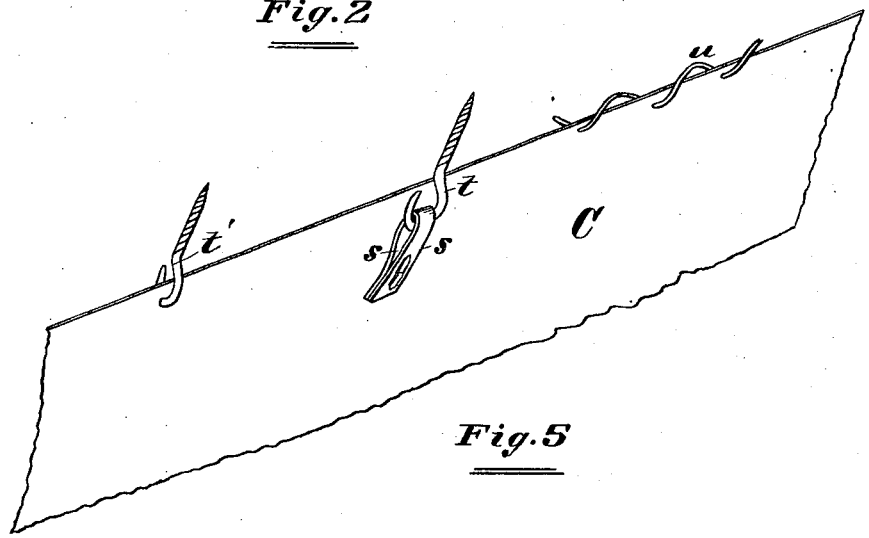
Fig.5
Attest:
W. T. Baker
C. B. Baker.
INVENTOR:
Taylor E. Daniels
Abraham Reed.
By R. C. Dyrenforth
Attorney
N. PETERS, PHOTO-LITHOGRAPHER, WASHINGTON, D.C.

UNITED STATES PATENT OFFICE.

TAYLOR E. DANIELS AND ABRAHAM REED, OF CHICAGO, ILLINOIS.

IMPROVEMENT IN COFFINS.

Specification forming part of Letters Patent No. 201,872, dated April 2, 1878; application filed January 26, 1878.

*To all whom it may concern:*

Be it known that we, TAYLOR E. DANIELS and ABRAHAM REED, of the city of Chicago, in the county of Cook and State of Illinois, have invented certain new and useful Improvements in Coffins; and we hereby declare the following to be a full, clear, and exact description thereof, reference being had to the accompanying drawings, of which—

Figure 1 is a plan view of the coffin with part of the trimmings removed, showing the false bottom beneath; Fig. 2, a longitudinal section on the line $x\ x$, Fig. 1; Fig. 3, a cross-section on the line $y\ y$, Fig. 1; and Fig. 4, a cross-section on the line $z\ z$, Fig. 1.

Our invention relates to a device for sustaining in a horizontal, or nearly horizontal, position the trimmings or "head-linings" which line the walls of the case, and which are always fastened thereto along their tops, and hang loose elsewhere. The purpose of so raising or spreading the trimmings is to bring them into a position convenient for inspection without handling. The effect is also greatly to improve the appearance of the coffins while in stock, since the ruffled trimmings, when so raised, meet, or nearly meet, at the center.

Hitherto it has been usual to support these trimmings by means of rolls or pads secured to the walls all around immediately below the line of fastening; but these answer their purpose very imperfectly, as the trimmings soon (especially in a damp atmosphere) droop or settle down beyond the edges of the rolls, thus assuming a limp and wilted appearance.

The object of our invention is to overcome this difficulty by providing a simple device whereby the trimmings may be held firm and straight at any desired height (not above the horizontal) for an unlimited period, and up to the instant of laying the remains within the casket, the arrangement being such that they subside beneath the body.

To this end our invention consists in providing the burial-case with a false bottom of satin, or any other suitable fabric or material, stretched across below the line of fastening of the trimmings, and held there by means capable of sustaining a moderate weight, but which will readily yield or give way beneath the pressure of the body as it is laid in, all as hereinafter more fully set forth.

In the drawings, A is the case, and B the trimmings, fastened to the walls along their tops in the usual manner. C is the false bottom, of satin or other material, fastened at its edges to the walls of the coffin at any desired distance below the line of fastening of the trimmings. Thus the lower or loose ends of the said trimmings lie upon the false bottom C, instead of hanging down the sides of the case.

If it is desired that the trimmings be spread out horizontally, it is only necessary to have the false bottom attached to the walls of the coffin immediately below the line at which the trimmings are fastened and drawn tight, so as to present a level surface. It is often preferred, however, to have the trimmings incline more or less toward the center, and this may be accomplished either by having the false bottom as above, but slack instead of tight, whereby it will sag in the center, or else by having it attached lower down the sides, as shown in the drawing.

The false bottom C is to be attached to the walls of the case by means adapted to sustain the weight of the trimming, and considerably more, but which will yield or break under the weight of the remains when they are placed within, allowing the false bottom to descend and the trimmings to assume their proper vertical position. We usually effect this by means of the elastic loops or straps $s$, secured to the false bottom C near its edges, and passing over hooks $t$, around the walls of the coffin at the proper height. These straps stretch under the weight of the body, allowing the whole to settle to the bottom of the coffin.

Instead of this device, the false bottom may be secured to the padding or lining of the walls by stitches $u$, which break when the body is laid in, effecting substantially the same results; or the edges of the false bottom may be caught upon hooks $t'$ in the walls, which tear out when the pressure occurs; or the false bottom may be stretched upon a slender frame of the same form as the plan outline of the coffin, so that it will set within close to the walls, the said frame being supported on compressible springs resting on the bottom of the coffin. Any means, in short, may be adopted for supporting the false bottom in the proper position, the said false bottom itself, howsoever secured, being the essential feature of our invention.

D is an elastic strap, extending entirely across the interior of the coffin at the point where the head enters. It is attached at its ends to the coffin-walls by any convenient means, immediately below the false bottom; and its purpose is to cause the said false bottom, with the trimmings, to form gracefully about the head, and also, by conforming closely to the shape of the head, to hold it in position.

What we claim as new, and desire to secure by Letters Patent, is—

1. In a coffin, the device for supporting the trimmings or head-linings B at any desired angle, consisting of the false bottom C, of satin or any other suitable fabric or material, placed below the line of fastening of the said trimmings, and held in position by any suitable means capable of resisting a moderate pressure, but which will yield or break under the weight of the body as the latter is placed within, substantially as described.

2. The combination of the false bottom C with the elastic straps $s$, connecting the edges of the same to the walls of the coffin, substantially as described, for the purpose set forth.

3. The elastic strap D, extending across the interior of the coffin, near the upper end, below the false bottom C, for the twofold purpose of limiting the subsidence of the said false bottom and the trimmings at this point, and forming a rest and holder for the head, substantially as described.

TAYLOR E. DANIELS.
ABRAHAM REED.

In presence of—
W. HENRY BURNS,
JAS. N. BURNS.